Figure 1:
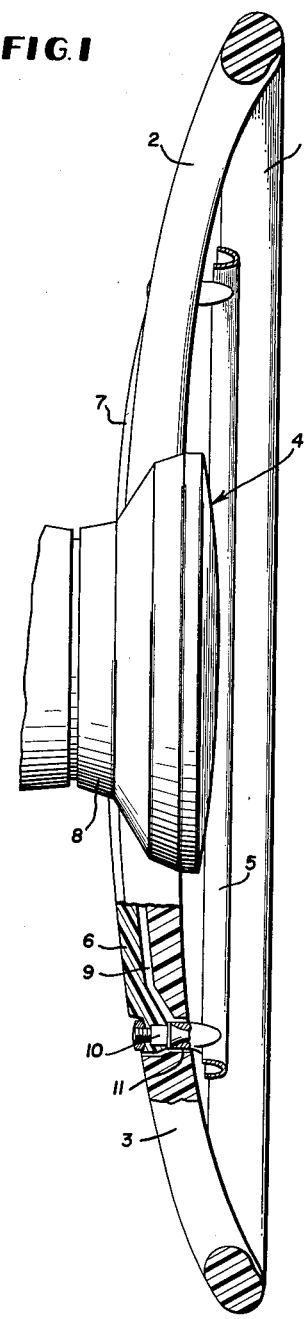

Oct. 27, 1964 J. MÜLLER ETAL 3,154,647
STEERING WHEEL WITH SWITCHING MECHANISM
Filed Jan. 18, 1960

INVENTORS
JOSEF MÜLLER
WILHELM ALBRECHT
BY
Dicke, Craig & Freudenberg
ATTORNEYS 3,154,647
STEERING WHEEL WITH SWITCHING
MECHANISM
Josef Müller, Stuttgart-Riedenberg, and Wilhelm Albrecht, Rietvaihingen (Enz), Germany, assignors to Daimler-Benz Aktiengesellschaft, Stuttgart-Unterturkheim, Germany
Filed Jan. 18, 1960, Ser. No. 3,190
Claims priority, application Germany Jan. 22, 1959
11 Claims. (Cl. 200—61.56)

The present invention relates to a steering wheel for motor vehicles, especially for passenger motor vehicles, provided with a signal ring disposed above the steering wheel spokes for actuating a switching device disposed below the steering wheel hub portion by pressure applied in the axial direction, and essentially consists in locating the spokes of the signaling ring completely below the surface formed or engendered by the steering wheel spokes.

By the use of an arrangement of the signaling ring and of the switching device in accordance with the present invention, the sliding contacts which are relatively expensive in themselves together with the relays necessary therefor are obviated which were necessary in the signal-actuating mechanisms of the type mentioned hereinabove used in the prior art.

Furthermore, it is possible by the use of the arrangement in accordance with the present invention to keep the distance of the steering wheel from the supporting bearing thereof at the steering wheel hub as small as possible whereby vibratory movements of the steering wheel are effectively avoided or at least minimized to a very large extent.

With most of the known steering wheels of the prior art, the actuating member for the signal horn is so located that in case of accident, especially in case of collision, the body of the driver impinges against the actuating device. The driver himself oftentimes is hurt as a result thereof. However, in almost every such case, the actuating device is damaged or is completely destroyed.

The novel arrangement of the actuating device in accordance with the present invention behind the steering wheel hub portion avoids these disadvantages and shortcomings of the prior art devices, and additionally enables a particular configuration of the wheel hub portion which is far more safe against accidents than most of the known steering wheel hub portions of the prior art. The entire side or face of the wheel hub portion facing the driver may now be used for padding or the like.

Additionally, the construction and arrangement of the steering wheel in accordance with the present invention is also advantageous for aesthetic reasons. The signaling ring has a particularly light-weight appearance with the accommodation thereof, in accordance with the present invention, and appears to be suspended above the steering wheel.

According to a further feature of the present invention, it is proposed for connecting the signaling ring and the signaling ring spokes to provide pins which extend essentially in the axial direction of the steering wheel through the steering wheel spokes within bores provided therein.

The signaling ring spokes may be disposed in the axial direction below the steering wheel spokes so that they are barely visible or not visible at all. In order to render the signaling ring spokes even more invisible, it is proposed, in accordance with a further feature of the present invention, that the signaling ring spokes be disposed in recesses provided on the steering wheel spokes on the side thereof opposite the driver, i.e., on the side turned away from the driver's side thereof.

Accordingly, it is an object of the present invention to provide a steering wheel construction which is safer in operation and which avoids the disadvantages of the prior art devices.

It is another object of the present invention to provide a steering wheel construction and arrangement in which the actuating device cooperating with the signaling ring is of less expensive construction and obviates also certain auxiliary devices, such as relays or the like.

Still another object of the present invention is the provision and arrangement of a steering wheel with a signaling ring in which the distance of the steering wheel from the bearing supporting the same at the steering wheel hub portion is as small as possible to minimize vibrations in the steering wheel.

Still another object of the present invention resides in the provision of a steering wheel construction which increases the safety to the driver as well as minimizes the danger to the signaling device actuating mechanism in case of damages such as collisions.

A further object of the present invention is the provision of a steering wheel construction entailing all the advantages mentioned hereinabove which, from an aesthetic point of view, is also pleasing to the eye in addition to the pragmatic advantages obtained thereby.

These and other objects, features and advantages of the present invention will become more obvious from the following description, when taken in connection with the accompanying drawing which shows, for purposes of illustration only, one embodiment of a steering wheel construction in accordance with the present invention and wherein—

Figure 2:
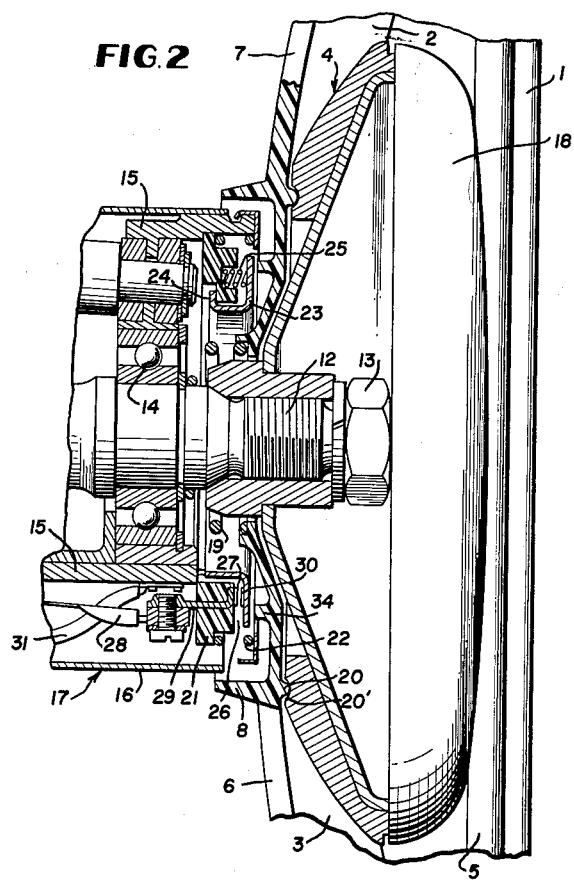
Figure 3:
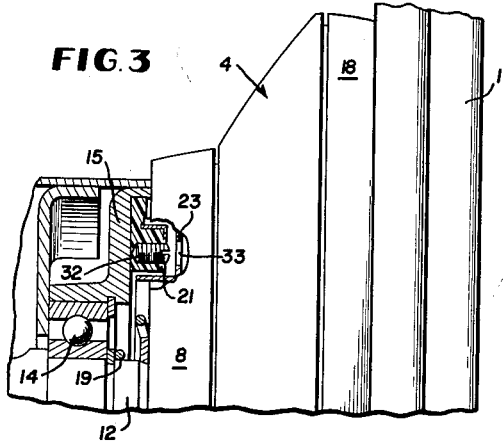

FIGURE 1 is a cross-sectional view through a steering wheel construction in accordance with the present invention, FIGURE 2 is an axial cross-sectional view on an enlarged scale, through the hub portion of the steering wheel of FIGURE 1, and FIGURE 3 is another cross-sectional view through the hub portion of the steering wheel similar to FIGURE 2 and taken in a different longitudinal axial plane.

Referring now to the drawing, wherein like reference numerals are used throughout the various views to designate like parts, and more particularly to FIGURE 1, the steering wheel essentially consists of the steering wheel rim portion 1, of the steering wheel spokes 2 and 3, and of the steering wheel hub portion generally designated by reference numeral 4.

The signaling ring 5 is disposed above the surface formed or defined by the steering wheel rim portion 1 and the steering wheel spokes 2 and 3 and is connected by means of spokes 6 and 7 (FIGURES 1 and 2) with the annular member 8 (FIGURES 1, 2 and 3) which is disposed below the steering wheel hub portion 4 and transmits the signaling movements of the signaling ring 5 to the switching member of the signal horn. The spokes 6 and 7 of the signal ring 5 are thereby disposed below the surface formed or defined by the steering wheel rim portion 1 and the steering wheel spokes 2 and 3, and more particularly, are accommodated in recesses 9 (FIGURE 1) provided in the steering wheel spokes 2 and 3. Pin members 10 are provided for purposes of operatively connecting the signaling ring 5 with the spokes 6 and 7 which pin members 10 extend essentially in the axial direction of the steering wheel through the steering wheel spokes 2 and 3 within bores 11 provided therein.

Consequently, as viewed in the direction from the person normally operating or handling the steering wheel 1, the spokes 6 and 7 of the signaling ring 5 are disposed below the steering wheel spokes 2 and 3. As a result thereof, the signaling ring spokes 6 and 7 are barely visible, if at all, on the part of the vehicle passengers.

Accordingly, it cannot normally be discerned without a careful inspection how the signaling ring 5 is retained in place since it has the appearance of being freely suspended. Consequently, the signaling ring 5 appears in an aesthetic particularly effective manner as being light and also appears to be arranged above the spokes of the steering wheel spokes as if freely suspended.

In case of a collision, the switching device of the signaling horn cannot be hit by the body of the driver. The same is true for the spokes 6 and 7 of the signaling ring 5. Consequently, in addition to the particular aesthetic effect produced in accordance with the present invention, a reduction of those causes result therefrom which might readily lead to injuries to the passengers, especially of the vehicle driver.

As is more clearly visible from FIGURE 2, the steering wheel hub portion 4 of the steering wheel 1 which is connected with the steering wheel spokes 2 and 3 emplaced over the end of the steering spindle 12 and is retained thereat by means of a nut member 13 in such a manner that each movement of the steering wheel in the circumferential direction thereof is transmitted into a rotary movement of the steering spindle 12. This may be obtained in any suitable known manner, for instance, by a keyway connection or the like. The steering spindle 12 is rotatably supported by means of roller bearings 14 within the housing part 15 which forms a part of the relatively fixed outer tubular cover 16 of the steering column generally designated by reference numeral 17. The side of the steering hub portion 4 facing the person operating the steering wheel 1 is provided with an elastic padding 18 which may consist, for example, of foam rubber covered with leather.

The annular member 8 disposed in the space between the steering wheel hub portion 4 and the roller bearing 14 which annular member 8 is operatively rigidly connected with the spokes 6 and 7 of the signaling ring 5. The compression spring 19 which abuts against the inner face of the roller bearing 14 thereby pushes the annular member 8 against the steering wheel hub portion 4, whereby the annular member 8 engages with the annular bulged or beaded portion 20 thereof into the annularly-shaped recess 20' (FIGURE 2) provided in the steering wheel hub portion 4. A contact ring 21 formed of an electrically neutral or insulating material is additionally disposed between the annular member 8 and the roller bearing 14 which contact ring 21 is pushed by spring 22 against a set-off or stepped portion within the housing part 15 in the direction against the roller bearing 14. The contact ring 21 does not partake in the rotary movement of the steering wheel 1. The ring 23 is connected with the contact ring 21 so as to be movable in the axial direction with respect thereto. The ring 23 is provided with three bent-back nose portions or projections 24 distributed over the periphery thereof which engage into corresponding recesses of the contact ring 21. The ring 23 is forced in the direction against the steering wheel hub portion 4 by means of three compression springs 25, also distributed in the circumferential direction and seated in the contact ring 21, and more particularly to such an extent that between the surface of the contact ring 21 and the ring 23 a free space or gap 26 results therefrom. The projections 24 of the ring member 23 thereby abut against the contact ring 21 and thus limit the movement of the ring member 23 in the direction toward the steering wheel hub portion 4.

Three silver contacts 27 equally distributed in the circumferential direction are arranged on the surface of the contact ring 21 in the free space 26 between the contact ring 21 and the ring member 23 which are adapted to be supplied with current through the electrical circuit or wire 28 and through the contact lug 29. Three complementary silver contacts 30 provided at the ring member 23 face the three silver contacts 27 at the contact ring 21. The ring member 23, and therewith the silver contacts 30 are connected with the electrical circuit or wire 31.

In order to enable adjustment or readjustment of the distance between the contact ring 21 and therewith between the ring member 23 and the annular member 8, three screws 32 distributed in the circumferential direction are arranged in the contact ring 21, as clearly visible from FIGURE 3, which are accessible from the outside through apertures 33 provided in the ring member 23. If the screws 32 are moved in the direction of the housing part 15, then the screws 32 tend to displace the contact ring 21 away from the housing part 15, whereby the distance between the ring member 23 and the annular member 8 becomes smaller.

A pressure applied to the signaling ring 5 in any desired position of the steering wheel 1 is transmitted by the spokes 6 and 7 against the effect of the compression spring 19 to the annular member 8 which, in turn, pushes with the annular projection 34 thereof (FIGURE 2) against the ring member 23 against the effect of the compression springs 25. As a result thereof, the free space 26 between the ring member 23 and the contact ring 21 is reduced, and at least one of the silver contacts 30 comes into contact with one of the silver contacts 27 so that the electric circuits 28 and 31 are electrically connected with each other and the signaling horn (not shown) is energized. It should be noted, in this connection, that according to the present invention, no sliding movement takes place at the silver contacts 27 and 30 during steering movements of the steering wheel 1 and simultaneous actuation of the signaling ring 5. A sliding movement only occurs between the annular projection 34 of the annular member 8 and the surface of the ring member 23 without affecting, however, the silver contacts 27 and 30.

While we have shown and described one embodiment in accordance with the present invention, it is understood that the same is not limited thereto but is susceptible of many changes and modifications within the spirit and scope of the present invention, and we, therefore, do not wish to be limited to the details shown and described herein but intend to cover all such changes and modifications as are encompassed by the scope of the appended claims.

We claim:

1. A steering wheel for motor vehicles, especially for passenger motor vehicles, comprising a steering wheel assembly including a steering wheel, a steering wheel hub portion, and steering wheel spoke means operatively connecting said steering wheel with said steering wheel hub portion, switch means disposed below said hub portion and adapted to be actuated by the application of axial pressure, and a signaling means including a signaling ring disposed above the surface defined by said steering wheel spokes, signaling ring spoke means adapted to actuate said switching means, said signaling ring spoke means being disposed completely below the surface formed by said steering wheel spoke means and essentially behind said steering wheel spoke means, and means operatively connecting said signaling ring to said spoke means.

2. A steering wheel for motor vehicles, especially passenger motor vehicles, comprising a steering wheel assembly including a steering wheel, a steering wheel hub portion, and steering wheel spoke means operatively connecting said steering wheel with said steering wheel hub portion, switch means having relatively stationary contact means disposed below said hub portion and adapted to be actuated by the application of axial pressure, and a signaling means including a signaling ring disposed above a surface defined by said steering wheel spokes, signaling ring spoke means rotatable in unison with said steering wheel spoke means and adapted to actuate said switching device, and means operatively connecting said signaling ring to said spoke means, and means disposed below said hub portion providing relative rotary movement between said signaling ring spoke means and said relatively stationary contact means for transmitting the axial actuating pressure from said ring to said contact means.

3. A steering wheel for motor vehicles according to claim 2, wherein the underside of said steering wheel spoke means is provided with recessed portions for accommodating therein said signaling ring spoke means.

4. A steering wheel according to claim 3, wherein said means operatively connecting said signaling ring to said spoke means comprises pin means operatively connecting said signaling ring means with said signaling ring spoke means, said pin means extending essentially in the axial direction of the steering wheel through bores provided in said steering wheel spoke means.

5. A steering wheel for motor vehicles according to claim 2, wherein said switch means includes a first stationary member having contact means, a second stationary member having contact means complementary to said first contact means, means for normally keeping said first mentioned and second mentioned contact means out of engagement, and wherein said means providing relative rotary movement between said signaling ring spoke means and said relatively stationary contact means includes an annular member rigidly connected for common rotation with said signaling ring spoke means and slidingly bearing against one of said contact parts.

6. A steering wheel for motor vehicles according to claim 5, further comprising means accessible from the outside of the steering wheel for effectively adjusting the amount of axial pressure necessary to close said first and second mentioned contact means.

7. A steering wheel for motor vehicles, especially passenger motor vehicles, comprising a steering wheel assembly including a steering wheel rim portion, a steering wheel hub portion and a plurality of steering wheel spokes rigidly connecting said hub portion with said rim portion, a signaling ring disposed above the surface defined by said steering wheel spokes, signaling ring spoke means disposed below the surface defined by said steering wheel spokes, means operatively connecting said signaling ring with said signaling ring spoke means to transmit the axial pressure from said signaling ring to said spoke means, a steering spindle, means for mounting said steering wheel hub portion on said steering wheel spindle for common rotation therewith, a steering column, means rotatably supporting said steering spindle in said steering column, an annular actuating member disposed behind said hub portion and rigidly connected with said spoke means, normally open switch means within said steering column disposed behind said annular member including normally open contact means, said annular member being adapted to close said contact means by transmitting thereto the axial pressure applied on said signaling ring while at the same time enabling relative rotary movement between said contact means and said annular member.

8. A steering wheel for motor vehicles, especially passenger motor vehicles, comprising a steering wheel assembly including a steering wheel rim portion, a steering wheel hub portion and a plurality of steering wheel spokes rigidly connecting said hub portion with said rim portion, a signaling ring disposed above the surface defined by said steering wheel spokes, signaling ring spoke means disposed below the surface defined by said steering wheel spokes, pin means operatively connecting said signaling ring means with said signaling ring spoke means, said pin means extending essentially in the axial direction of the steering wheel through bores provided in said steering wheel spoke means for transmitting axial pressure from said signaling ring to said spoke means, a steering spindle, means for mounting said steering wheel hub portion on said steering wheel spindle for common rotation therewith, a steering column, means rotatably supporting said steering spindle in said steering column, an annular actuating member disposed behind said hub portion and rigidly connected with said spoke means, normally open switch means disposed behind said annular member within said steering column including normally open contact means, said annular member being adapted to close said contact means by transmitting thereto the axial pressure applied on said signaling ring while at the same time enabling relative rotary movement between said contact means and said annular member.

9. A steering wheel for motor vehicles according to claim 8, wherein said steering wheel spokes are provided with recesses, and wherein said spoke means are accommodated within said recesses, said recesses being disposed on the side of said spokes facing said steering column.

10. A steering wheel for motor vehicles as defined in claim 9, wherein said switch means includes a first member having a contact means, a second member having a contact means complementary to the first contact means, and means for normally holding said first and second contact means out of engagement, said first and second members being supported within said steering column stationary in a rotary direction with respect to each other and to said steering column, and further including means for normally holding said annular member against said hub portion for rotation therewith, said last-mentioned means being adapted to allow movement of said annular member to close said contact means upon the transmission thereto through said pins and spoke means of an axial pressure applied on said signaling ring.

11. A steering wheel for motor vehicles, especially passenger motor vehicles, provided with a pressure-operated switching device operative by pressure in the axial direction comprising a steering wheel assembly including a steering wheel, a steering wheel hub portion, and a plurality of steering wheel spokes operatively connecting said steering wheel with said steering wheel hub portion, and a signaling means including a signaling ring disposed above the surface defined by said steering wheel spokes, signaling ring spoke means operatively connected therewith and adapted to actuate said switching device, said signaling ring spoke means being disposed essentially behind said steering wheel spokes in recesses provided in said steering wheel spokes on the side thereof turned away from the side facing the driver, and means operatively connecting said signaling ring to said spoke means comprising pin means extending essentially in the axial direction of said steering wheel through the steering wheel spokes within bores provided therein.

References Cited in the file of this patent
UNITED STATES PATENTS

| | | |
|---|---|---|
| 2,286,016 | Sladky | June 9, 1942 |
| 2,555,510 | Sampson | June 5, 1951 |
| 2,744,975 | Naumann | May 8, 1956 |
| 2,872,539 | Berner | Feb. 3, 1959 |